United States Patent [19]

Sandvik et al.

[11] 4,070,946

[45] Jan. 31, 1978

[54] FLUID ACTUATOR

[75] Inventors: Roger H. Sandvik, Eastlake; Richard G. Huebscher, Cleveland, both of Ohio

[73] Assignee: Design & Manufacturing Corporation, Willoughby, Ohio

[21] Appl. No.: 682,192

[22] Filed: May 3, 1976

[51] Int. Cl.[2] ........................ F15B 15/22; F01B 19/04; F16J 3/02

[52] U.S. Cl. ........................................ 91/25; 92/85 R; 92/98 D; 92/101; 92/129; 92/130 R; 92/165 R

[58] Field of Search ............ 92/101, 165, 85 R, 98 D, 92/208, 129, 130 R; 91/25

[56] References Cited

U.S. PATENT DOCUMENTS

| | | | |
|---|---|---|---|
| 3,039,127 | 6/1962 | Molenaar | 92/85 R |
| 3,053,235 | 9/1962 | Hager | 92/85 R |
| 3,082,792 | 3/1963 | Jenkins | 92/101 |
| 3,293,992 | 12/1966 | Baumann | 92/208 |
| 3,309,967 | 3/1967 | Taplin | 92/101 |
| 3,386,345 | 6/1968 | Taplin | 92/101 |
| 3,991,572 | 11/1976 | Huebscher | 219/270 |

FOREIGN PATENT DOCUMENTS

| | | | |
|---|---|---|---|
| 1,255,063 | 1/1960 | France | 92/98 D |
| 1,401,126 | 7/1975 | United Kingdom | 92/85 R |
| 1,406,892 | 9/1975 | United Kingdom | 92/98 D |

*Primary Examiner*—William R. Cline
*Assistant Examiner*—Abraham Hershkovitz
*Attorney, Agent, or Firm*—Donnelly, Maky, Renner & Otto

[57] ABSTRACT

The actuator piston has a generally cylindrical central projection about the exterior of which a similarly formed rolling diaphragm is closely fitted. The piston rod can turn freely, to avoid any twisting of the piston and diaphragm, and can also be axially withdrawn from its engagement with the piston. Return spring means extends into the diaphragm enclosed part of the piston.

1 Claim, 4 Drawing Figures

FLUID ACTUATOR

This invention relates to lightweight fluid actuators, and has for its principal object the provision of such an actuator of small size having a long stroke in relation to its operative diameter.

In its preferred embodiment, the new actuator has an overall length of about three to four inches and is designed to provide a working output force on the order of from about four to about twelve pounds. Such illustrative characteristics are noted to indicate the class of actuator involved, for example, as used in fluid control systems, and its relatively long stroke for its size is realized by the combination of a rolling diaphragm as an operating member and a deep piston form actuated by the diaphragm to produce the outstroke of the actuator.

It is also an object of the present invention to provide a piston rod for such piston that is free to turn with respect to the same, so that any external rotative movement that the rod might experience will not appear at the interface of the piston and the diaphragm where it could cause damage to the latter.

The piston and piston rod assembly, furthermore, provides dis-engagement of the rod from the piston in the event of any withdrawal of the rod from the actuator again externally rather than as a result of normal operation by the diaphragm, with this feature precluding diaphragm damage in the case of this type of relative movement of the rod.

Among other objects of the invention are positive spring return of the piston assembly for double action, decrease in the overall length of the actuator, and the use of components that can readily be supplied for low actuator manufacturing costs.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
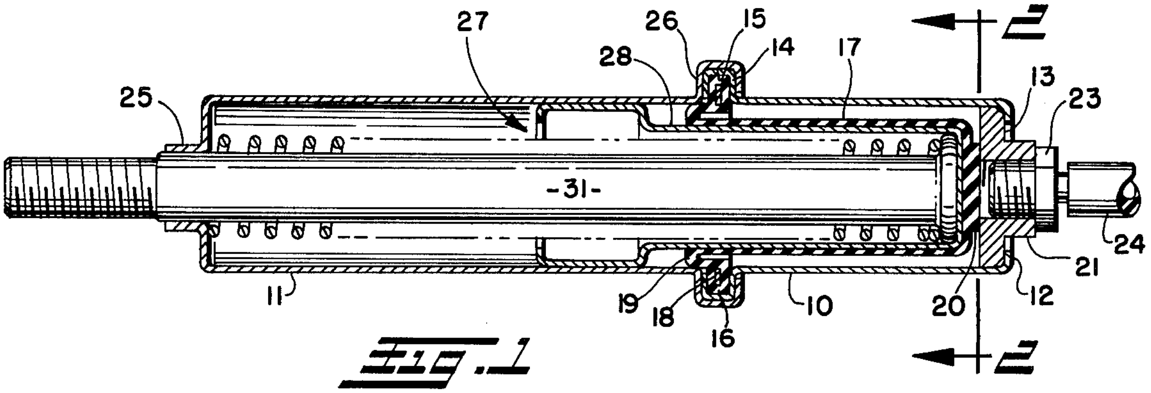
FIG. 1 is a longitudinal section of an actuator in accordance with the present invention.
Figure 2:
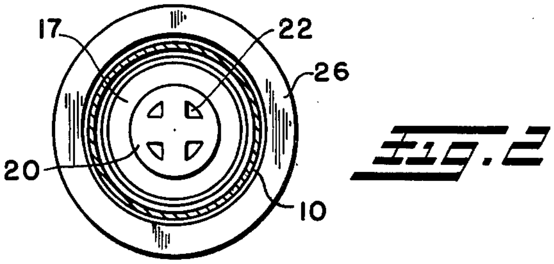
FIG. 2 is a transverse section viewed at the plane indicated by the line 2—2 in FIG. 1.

Referring now to the drawing in detail, the new actuator comprises a cylindrical pressure housing 10 and a nose cap 11 that is also cylindrical and an extension of the pressure housing. Both members, which together form the complete outer housing of the actuator, are eyeletted or deep drawn metal pieces in this embodiment.

The operative outer end of the housing 10 has an inner radiused flange 12 defining a circular opening 13 at such end, while the other or inner end has an outer rebent flange 14 forming an inner peripheral recess 15. Seated in this recess is an end bead 16 of a cylindrical diaphragm 17 made of a suitable elastomeric material, such as a urethane rubber compound, and the bead contains a stiffening, flat metal washer 18. The diaphragm body extends from such bead outwardly only a short distance and is then folded at 19, so that the body normally relaxed extends from the inner end of the housing 10 to a closed end adjacent the other or outer end opening 13 of the housing.

At its closed end, the diaphragm is provided with an integral, exteriorly projecting bumper 20 of disc shape, which normally abuts a threaded fitting 21 secured, by soldering or the like, inside the housing end as shown. The bumper is provided with several small channels 22 for a purpose to be described, and the fitting is adapted to receive a male end connector 23 of a fluid hose or line 24.

The nose cap 11 at its respective outer end has an outwardly flanged central opening 25 and its inner end also is formed with an outer rebent flange 26. This cap flange is closely fitted over the diaphragm bead containing flange 16 of the pressure housing and the former is crimped about the latter to secure the two pieces firmly together. A piston designated generally by reference numeral 27 is contained within the actuator and is another eyeletted or deep drawn metal part. The major extent of the piston is a closed end cylinder 28, and there is at the open end a diametrically enlarged and also cylindrical skirt 29 that fits closely but slideably within the nose cap 11. The skirt terminates in an inturned stop flange 30.

The body of the piston is snugly received within that of the diaphragm and, in fact, the latter can and preferably should be tapered over its whole length and stretched tightly over the piston to prevent any pucker and resulting voids between the two.

A piston rod 31 having a cold formed or machined head 32 is disposed with such head normally engaged against the inner end of the piston, without actual attachment here or elsewhere to the piston. The rod is of course on the axis of the actuator and extends outwardly through the nose cap opening 25 for extension and retraction. Extension is caused by rolling of the diaphragm when pressurized fluid, such as air, is supplied to the interior of the housing 10 by line 24, and retraction is accomplished, upon venting of the line and hence the housing, by a return spring 33 about the rod between its head 32 and the outer end of the cap 11.

Figure 3:
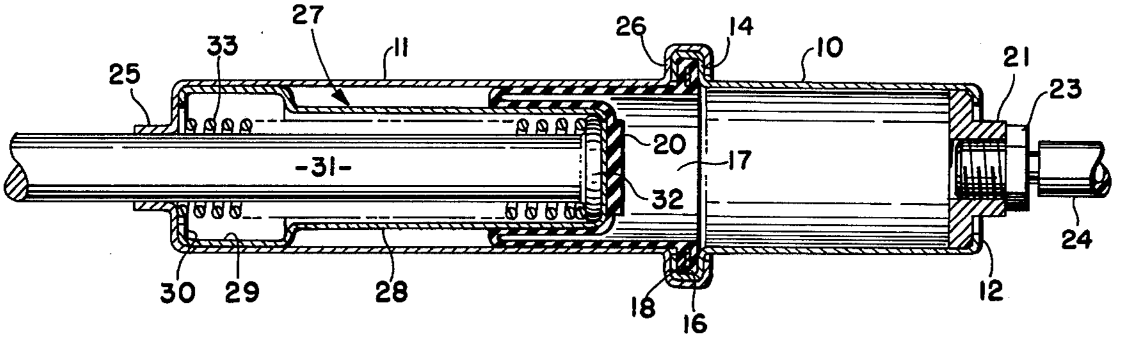
FIG. 3 is a section comparable to FIG. 1 in which the actuator is shown in another operating condition.

The operation of the actuator will thus be obvious, and it will be appreciated that when pressurized air, for example, is supplied to the housing, the bumper channels 22 immediately admit the air to the interior of the housing. The outer movement or outstroke of the rod 31 by the rolling diaphragm 17 is limited by engagement of the piston skirt stop flange 30 with the outer end of the nose cap, while the instroke by the return spring 33 is terminated by engagement of the diaphragm bumper 20 with the pressure housing end fitting 21. These extreme conditions of adjustment or operation are shown in FIGS. 3 and 1, respectively.

Figure 4:
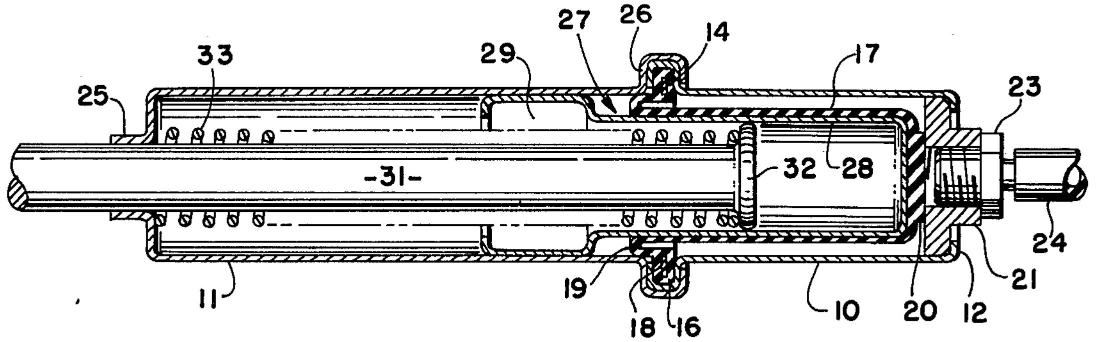
FIG. 4 is likewise similar to FIG. 1, but with the piston rod disengaged from the piston.

It will also be appreciated, as shown in FIG. 4, that the actuator piston rod can move axially away from the piston in all positions of the latter and can in fact, within limits, reciprocate relative to the piston. The rod can also turn separately, so as not to twist the piston and the tightly fitted diaphragm. The central parts of the piston and diaphragm can safely be bonded by cementing, if desired.

The disclosed embodiment of the new actuator has been designed to provide a stroke of one inch with a diameter of one half inch, and, in this form, the return spring can exert three pounds pressure when expanded (FIG. 1) and nine, ten or fifteen pounds compressed (FIG. 3) for output stroke forces of six, seven or twelve pounds, respectively. These characteristics are of course only illustrative, involving return spring selection and proper length of the rolling diaphragm and nose cap in design.

We, therefore, particularly point out and distinctly claim as our invention:

1. A linear fluid actuator comprising housing means having a fluid chamber, a folded diaphragm forming a movable wall of said chamber, the central part of said diaphragm being cylindrical and normally projecting into said chamber, a piston having a hollow central cylindrical section closely contained within the like part of said diaphragm, the admittance of fluid under pressure to said chamber causing said diaphragm to roll to expand said chamber and thereby move said piston, a piston rod at least partly contained within said hollow central cylindrical section of said piston, said rod being rotatable freely relative to said piston whereby said rod can turn without twisting of said piston and diaphragm, and said rod also being capable of withdrawal axially from said piston without moving the latter, said housing means including cap means containing at least part of each of said piston and rod for guiding the same for substantially linear movement in the axial direction of the actuator, said piston being axially longer than the axial length of the central part of said diaphragm and including skirt means having a diameter larger than the diameter of the piston section within the central part of said diaphragm and closely fitting with respect to said cap means for accurately guiding said piston for such linear movement, said skirt means including an appreciable surface area along the axial extent of the actuator in such closely fitting relationship with said cap means and being cooperable with the latter to hold said piston and said diaphragm in relatively fixed radially spaced relationship with respect to said housing means, return spring means between said cap means and said rod for normally urging the latter to engagement with said piston and said piston and diaphragm in a direction in said housing means to reduce said chamber, a portion of said spring means being accommodated within said piston, said housing means including fluid inlet means in a wall thereof for supplying fluid to said chamber, and said diaphragm including exteriorly projecting bumper means on the movable wall thereof directly facing said fluid inlet means for abutting said wall of said housing means in covering relationship with respect to said fluid inlet means to space said movable wall from said housing means when the actuator is not energized and said chamber is unexpanded, said bumper means having channel means therein for passing fluid from said fluid inlet means into said chamber for substantially uniform distribution of fluid in said chamber to energize the actuator and to expand said chamber.

* * * * *